Nov. 25, 1952　　　　　F. F. FOX　　　　　2,619,048
DOUGH MOLDING MACHINE
Filed Nov. 26, 1948　　　　　　　　　　　4 Sheets-Sheet 1

Inventor
Fred Frank Fox
by Michaely & Michaelis,
Attys.

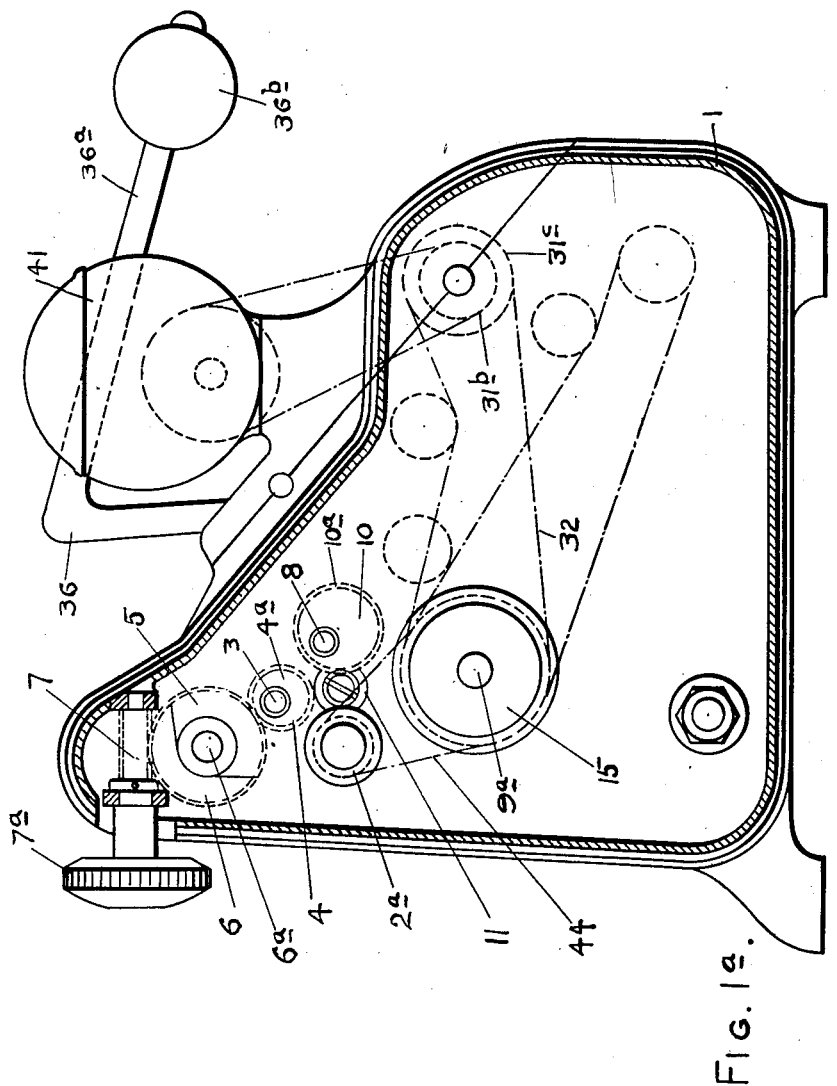

Nov. 25, 1952  F. F. FOX  2,619,048
DOUGH MOLDING MACHINE
Filed Nov. 26, 1948  4 Sheets-Sheet 3
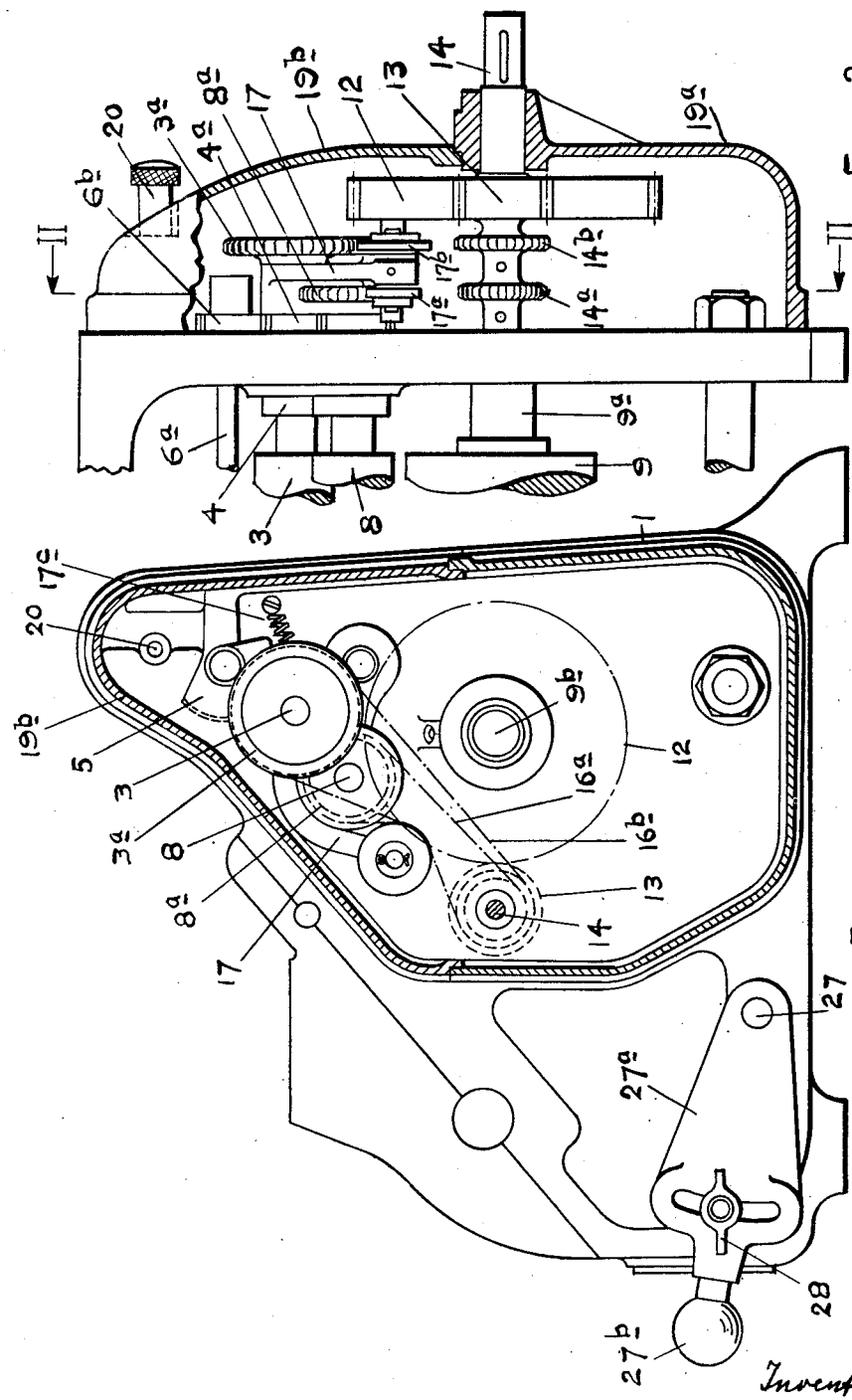

Nov. 25, 1952 F. F. FOX 2,619,048
DOUGH MOLDING MACHINE
Filed Nov. 26, 1948 4 Sheets-Sheet 4
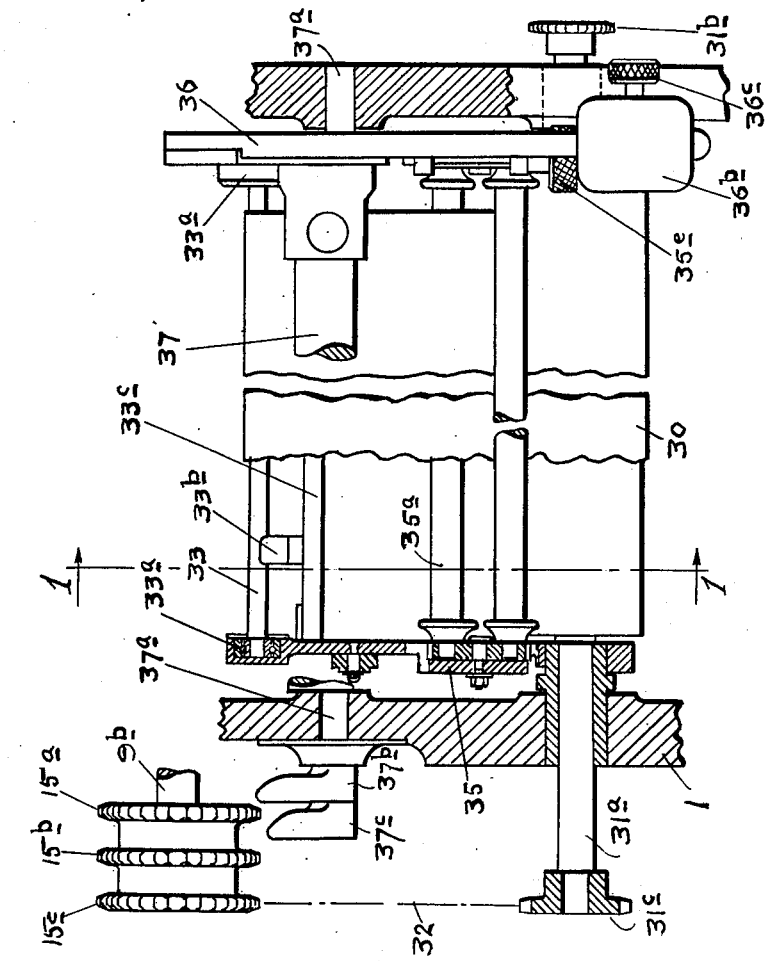
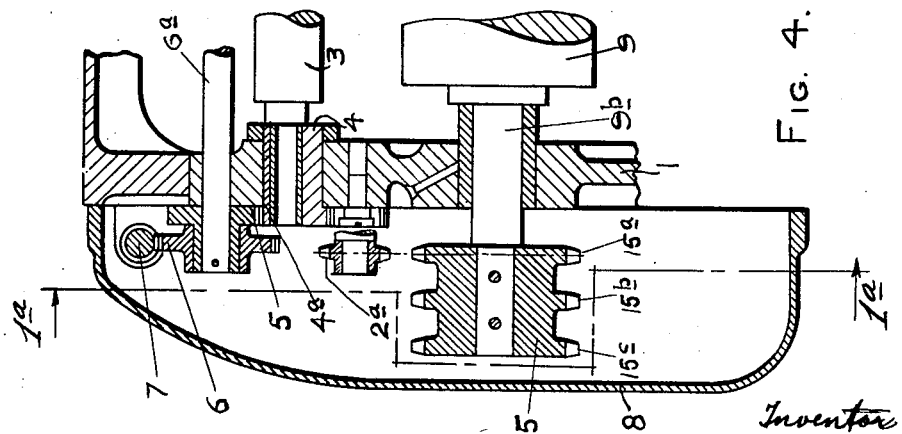
Inventor
Fred Frank Fox
By Michaelis & Michaelis
Attys.

Patented Nov. 25, 1952

2,619,048

UNITED STATES PATENT OFFICE 2,619,048

DOUGH MOLDING MACHINE

Fred Frank Fox, London, England

Application November 26, 1948, Serial No. 61,945
In Great Britain November 27, 1947

1 Claim. (Cl. 107—12)

The invention relates to a dough moulding machine, for example for Viennese, French and fancy bread, such as crescents, sticks, strings, twins, salt sticks, cannons, knots, poppy seed and brioche crescents, and has the main object of providing an improved arrangement of sheeting rollers therefor.

According to a main feature of the invention I arrange consecutive pairs of sheeting rollers at the intake side of the moulding machine, the distance between the rollers of each pair being simultaneously adjustable, by journalling one roller of each pair eccentrically in a crank member pivoted in the machine frame for being turned by adjustment means common to all said crank members.

Other objects and features of the invention will become clear later in the specification.

In order that the invention may be better understood an embodiment thereof will now be described by way of example and with reference to the accompanying drawings of which:

Figs. 1a and 2 are elevations, partly in section on the lines Ia—Ia and II—II of Figs. 4 and 3, respectively.

Figs. 3 and 4 are elevations, partly in section at right angles to Fig. 1 of the two ends of the moulding machine.

Fig. 5 is a plan view, partly in section, of a detail of the moulding machine.

Figure 1:
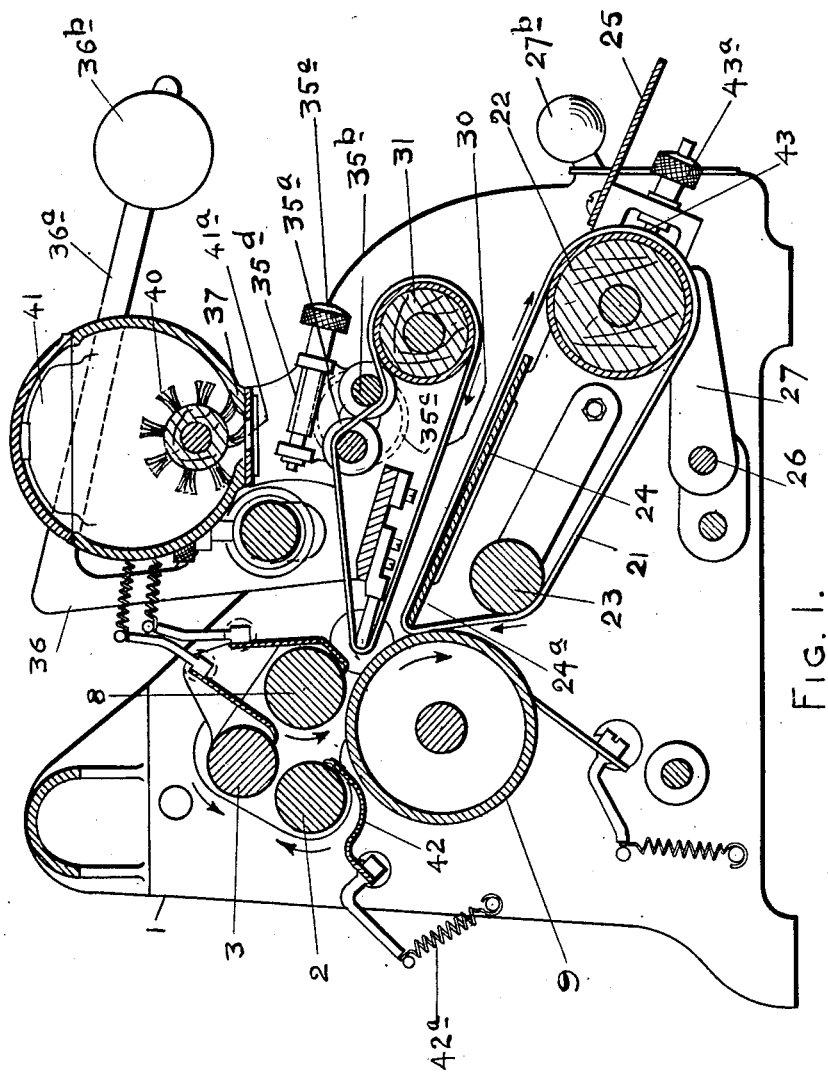
Fig. 1 is an elevation in cross section through the moulding machine taken on line I—I of Fig. 5.

In the stationary frame 1 (Fig. 1) a first pair of sheeting rollers 2, 3 of approximately equal diameter is pivoted in a manner permitting the adjustment of the gap between them. This is effected in the present embodiment by journalling the lower roller 2 directly in the frame 1, while journalling the upper roller 3 in an eccentric 4 pivoted in the frame 1 (Figs. 1a and 4). This eccentric 4 has, outside the frame 1, spur teeth 4a in mesh with a toothed sector 5 which is keyed or pinned to a shaft 6a together with a worm wheel 6. The latter is in mesh with a worm 7 which can be turned by means of a hand wheel or handle 7a (Fig. 1a).

The shaft 6a extends across the frame 1 and carries another toothed sector 6b outside the frame 1 operating a symmetrical arrangement of eccentric for the other journal of the roller 3 (Fig. 2).

Behind the first pair of sheeting rollers 2, 3 and slightly below there is a second pair of sheeting rollers 8, 9 (Fig. 1), of which the upper roller 8 is of approximately the same diameter as the rollers of the first pair. This roller 8, too, is journalled in an eccentric 10 (Fig. 1a) having spur gear teeth 10a which mesh with an idler pinion 11, in turn in mesh with the spur teeth 4a. Consequently the eccentrics 10 are turned together with the eccentrics 4 of the roller 3, which results in an adjustment of the position of the roller 8 being effected simultaneously with that of roller 3.

The lower roller 9 of the second pair is of substantially larger diameter than the rollers 2, 3 and 8 and is in fact designed as a drum. This roller is again journalled in the frame 1 directly, i. e. without adjustability with the axles 9a, 9b (Figs. 3 and 4, respectively). The axle 9a carries a big spur gear wheel 12 which is in mesh with the spur pinion 13 of the driving shaft 14 on which a belt pulley or the like (not shown) is keyed to be driven from an electromotor or the like. The other axle 9b (Fig. 4) carries a triple sprocket wheel 15 from which various chain drives are derived, as will be explained later.

On the driving shaft 14 (Fig. 3) there are also two sprocket wheels 14a and 14b for chain drives 16a and 16b (Figs. 2 and 3) both tensioned by the plain jockey wheels 17a and 17b respectively, both pivoted on the rocking arm 17. Chain drive 16a drives the sprocket wheel 8a of the upper inner roller 8, and chain 16b drives the sprocket wheel 3a of the upper outer roller 3. The rocker lever 17 is biased by the spring 17c (Fig. 2).

The outside of the frame 1 is covered on both ends by covers 18 (Fig. 4) and 19a, 19b, of which 18 and the upper part 19b are quickly detachable by means of knurled screws 20 (Fig. 3), while the lower part 19a journals the driving shaft 14.

As will be clear from the chain drive diagram and the meshing of the spur gears 12, 13 in Figs. 2, 3 the two upper rollers 3, 8 rotate in the same direction though at a different speed, while the lower roller or drum 9 rotates in the opposite direction.

From one of the sprocket wheels 15a, of the triple sprocket wheel 15 (Fig. 4), a chain drive 44 runs to the sprocket wheel 2a (Fig. 1a) of the lower outer roller 2 and driving the latter accordingly in the opposite sense of rotation to the upper roller 3.

Accordingly, the rollers 2, 3, 8, 9 move all in the same circumferential direction at their respective gaps, and will move any piece of dough fed between the outer rollers 2, 3 to the right hand side in Fig. 1, i. e. towards the two belts to be described in what follows.

The lower belt 21 (Fig. 1) runs over a lower drum 22, an upper roller 23 and the rounded inner edge 24a of a plate 24 sloping towards the delivery end of the moulding machine. It runs very near the surface of the lower inner roller 9 and in the same sense of rotation, i. e. clockwise in Fig. 1, any dough delivered from the inner pair of rollers 8, 9 being taken over from them by belt 21 near the rounded edge 24a and carried down towards the stationary delivery plate 25.

The lower drum 22 is journalled at the end of an arm 26 pivoted in frame 1 on a stub shaft 27 that carries the segmented hand lever 27a. The latter can be adjusted by means of the grip 27b and clamped to the frame 1 by a wing nut 28 (Fig. 2). Thus the position of the roller 22 can be adjusted and fixed in any appropriate manner. The lower drum 22 is driven by a chain 29 running over the sprocket wheels 15b (Fig. 4) and 22a, i. e. in the same sense of rotation as the lower roller 9 of the inner pair. The chain 29 is tensioned by a jockey wheel 22b (Fig. 1a).

The upper belt 30 runs in the same sense of rotation as the lower belt 21 and consequently the portions facing one another run in opposite directions as indicated in Fig. 1 by the arrows. Accordingly any piece of dough, pinned out previously in two successive stages by the pairs of rollers 2, 3 and 8, 9 that travels down the lower belt 21 is rolled upon itself by the upper belt 30 so as to form a stick etc. that can subsequently be formed into a crescent, if desired.

The upper belt 30 runs in a separate unit which is tiltable with respect to the lower belt 21 so as to allow an adjustment of the gap between the two opposing portions of the two belts. The upper belt 30 runs over a rear roller or drum 31 which is journalled with its axles 31a in the main frame 1 (Figs. 1a and 5). The left axle carries a sprocket wheel 31c which is driven by a chain 32 from the sprocket wheel 15c on the shaft 9b of the roller 9 by means of a chain 32 which is tensioned by a jockey wheel 32a. The right hand end of the axle 31a carries a sprocket wheel 31b which will be described later. The chain 32 drives the roller 31 in the same sense of rotation as roller 9 i. e. in the appropriate direction to cause the running of the belt 31 as described hereabove.

A frame 34 is pivoted co-axially with the roller 31 (Figs. 1a and 5) and carries at its front end a thin roller 33 journalled in ball bearings 33a; this thin roller 33 is protected against deflection due to the pull of the belt 30 by smooth half-bearings 35b attached to a cross bar 33c of the frame 34.

Two rollers 35a and 35b are journalled on a double eccentric 35, and the belt 30 runs between them, so that by turning the eccentric 35 by means of a worm wheel 35c engaged by a worm 35d the tension of the belt 30 can be adjusted by means of a knurled knob 35a.

An arm 36 in the shape of a bell crank lever is rigidly connected with the frame 34 (Figs. 1 and 5). The upper arm 36a thereof carries an adjustable counterpoise 36b which can be clamped to it by means of a knurled screw 36c. The lower arm 36d has an elongated slot 36a which is engaged by an eccentric cross member 37 pivoted in the main frame 1 at 37a. This eccentric member can be turned by means of a handle 37b, and fixed in any position by means of the clamp 37c (Fig. 5). Thereby the position of the frame 34, and accordingly that of the upper belt 30, with respect to the lower belt 21, can be adjusted, the counterpoise 36b allowing the centre of gravity of the whole unit of frame 34 to be brought into the desired position with respect to the axis of the drum 31, about which the said unit is pivoted.

From the sprocket wheel 31b at the right hand end of the roller 31 (Fig. 5) a chain 38 runs to a sprocket wheel 39 driving a rotary brush 40, eccentrically arranged in the flour compartment 41 (Fig. 1) so as to sprinkle flour continuously on the belt 30 through a slot 41a in the bottom of the said compartment, and thus to prevent the dough from sticking to the belts 30 and 21.

The sticking of dough to the rollers 2, 3, 8 and 9 is prevented by scrapers 42 pivoted in the main frame 1 and biased against the respective rollers by springs 42a. The tension of the belt 21 can be adjusted by a tensioning device 43, operated by a knurled screw knob 43a (Fig. 1).

I wish it to be understood that I do not desire to be limited to the exact details of construction shown and described, for obvious modifications will occur to a person skilled in the art.

What I claim as my invention and desire to secure by Letters Patent, is:

In a dough moulding machine, a control member, a worm connected with the said control member, a worm wheel in mesh with the said worm, a toothed gear member connected with the said worm wheel, a crank member, a toothed gear member connected to the said crank member and in mesh with the first mentioned gear member, a second crank member, gearing means arranged for gearing the said two crank members together for simultaneous rotation in the same direction, and journalling means eccentrically arranged on each of the said crank members for journalling one of a pair of sheeting rollers in each of the said crank members.

FRED FRANK FOX.

REFERENCES CITED

The following references are of record in the file of this patent:

UNITED STATES PATENTS

| Number | Name | Date |
|---|---|---|
| 1,355,908 | Petri | Oct. 19, 1920 |
| 1,519,569 | Vicars | Dec. 16, 1924 |
| 1,781,546 | Harber | Nov. 11, 1930 |
| 1,800,415 | Van Houten | Apr. 14, 1931 |

FOREIGN PATENTS

| Number | Country | Date |
|---|---|---|
| 171,526 | Great Britain | Nov. 24, 1921 |
| 308,666 | Italy | June 12, 1933 |
| 327,812 | Italy | July 19, 1935 |
| 379,465 | Italy | Mar. 28, 1940 |
| 443,335 | Germany | Apr. 26, 1927 |
| 605,416 | France | Feb. 16, 1926 |